United States Patent [19]

Gotoh et al.

[11] Patent Number: 4,927,044

[45] Date of Patent: May 22, 1990

[54] HEAT INSULATING CASE AND PROCESS FOR PREPARING THE SAME

[75] Inventors: Masao Gotoh, Yokosuka; Yasuo Hira; Kenichi Waragai, both of Fujisawa; Shozo Nakamura, Yokohama; Hitoshi Yokono, Katsuta, all of Japan

[73] Assignee: Hitachi, Ltd., Tokyo, Japan

[21] Appl. No.: 706,248

[22] Filed: Feb. 28, 1985

Related U.S. Application Data

[63] Continuation of Ser. No. 442,464, Nov. 17, 1982.

[30] Foreign Application Priority Data

Nov. 20, 1981 [JP] Japan .................................. 56-185366
Nov. 20, 1981 [JP] Japan .................................. 56-185373

[51] Int. Cl.$^5$ ............................................. B65D 25/00
[52] U.S. Cl. ....................................................... 220/83
[58] Field of Search ........................... 220/83; 264/45.5

[56] References Cited

U.S. PATENT DOCUMENTS

| | | | |
|---|---|---|---|
| 3,734,336 | 5/1973 | Rankow | 220/902 |
| 3,799,386 | 3/1974 | Madalin et al. | 220/902 |
| 4,304,810 | 12/1981 | Gates et al. | 264/45.5 |
| 4,309,373 | 1/1982 | Althausen et al. | 264/45.5 |
| 4,379,856 | 4/1983 | Samaritter et al. | 264/45.5 |
| 4,424,177 | 1/1984 | Immel | 264/45.5 |

*Primary Examiner*—Steven M. Pollard
*Attorney, Agent, or Firm*—Antonelli, Terry, Stout & Kraus

[57] ABSTRACT

Cases for automobile air conditioners or car-loaded refrigerators are molded in an integrated structure of a body part and fixing parts by reaction injection molding from a mixture of a liquid A comprising 20–60% by weight of an aliphatic amine-based polyol, 30–60% by weight of a PO adduct of 4,4′-diaminodiphenylmethane and 15–40% by weight of an ordinary polyol and further containing a foam-controlling agent, a foaming agent and a catalyst and a liquid B comprising polyisocyanate as obtained through impingement.

16 Claims, 8 Drawing Sheets

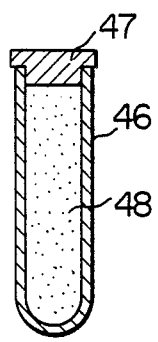
FIG. 9
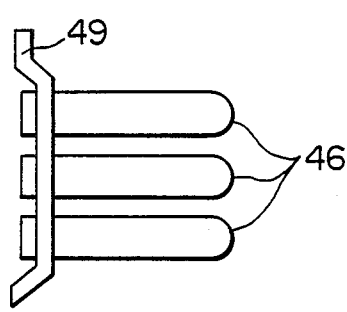
FIG. 10
FIG. 11
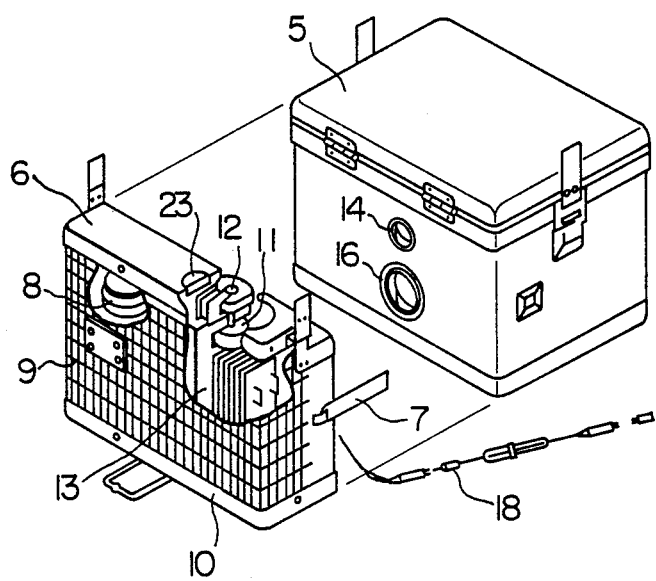

HEAT INSULATING CASE AND PROCESS FOR PREPARING THE SAME

This application is a continuation, of application Ser. No. 442,464, filed Nov. 17, 1982.

BACKGROUND OF THE INVENTION

This invention relates to a heat-insulating case with a light weight and a high heat-insulating characteristic, the case being in an integrated structure of a high density layer and a low density layer, and to a process for preparing the said heat-insulating case through one step according to reaction injection molding using a liquid raw material of high chemical reactivity.

Plastic structures comprised of an injection-molded base of, for example, ABS (acrylonitrilebutadienestyrene) resin or polypropylene resin, and a single or laminated heat-insulating foam layer of, for example, polyethylene foam, polystyrene foam or polymethane foam, as bonded to the base, have been so far used for cases for air conditioners of controlling the room temperature and humidity of automobiles. A vacuum-molded base of polypropylene resin sheet is also used in place of the injection-molded base of ABS resin.

However, these structures not only require much labor and time in molding work of the base and foam as well as in the bonding work, but also a distinguished heat-insulating efficiency cannot always be obtained in spite of the increased number of the required parts.

A refrigerator which can be loaded on a car and also can be transported by itself when not loaded on it has not been commercially available, but the case for such refrigerator could be prepared basically according to the conventional art, for example, by individually molding an inner case structure and an outer case structure of the ordinary plastic and by injecting polyurethane into between these case structures to obtain a heat-insulating case, but such art would not be efficient in the required molding facility, a plurality of required materials, and increased numbers of process steps and required parts, as in the case for the said air conditioners

SUMMARY OF THE INVENTION

An object of the present invention is to provide a heat-insulating case with a light weight, a good heat-insulating characteristic and a good vibration resistance, free from the disadvantages of the prior art, and also is to provide a process for preparing the same.

A raw material for preparing a heat-insulating case according to the present invention is a liquid raw material of high chemical reactivity, which is comprised of two separate compositions, i.e. a polyisocyanate composition on one hand and a composition comprising a polyhydroxy compound (polyols), a foaming agent and an additive on the other hand. Molding is carried out by a recently developed molding apparatus comprising a reaction injection molding machine and a mold clamping mechanism, and the molding process comprises mixing the said compositions in the mixing head section of the reaction injection molding machine under mutual impingement of the two compositions under a high pressure, for example, of 100 to 200 kg/cm$^2$, and then injecting the mixture into a mold under a low pressure, for example, 2–10 kg/cm$^2$, and molding an article of desired shape through heat generation, foaming and hardening by chemical reaction of the said two compositions. The molding process utilizing such chemical reaction is called "reaction injection molding" which will be hereinafter referred to as "RIM".

The RIM process is characterized by utilizing the fact that a low boiling solvent as a foaming agent can produce foam cells in a molding owing to vaporization caused by the heat of chemical reaction in a mold and controlling an injection amount to adjust the density of the molding to any desired one in the range of 10 to 12,000 kg/m$^3$. The resulting molding is characterized by a sandwich structure having high density skin layers and a low density core layer between the skin layers. To make the density of the entire molding lower is more effective means for giving a better heat-insulating characteristic to a molding. However, the strength of the molding structure is decreased with decreasing density, and thus it is necessary for applications to cases for automobile air conditioner or car-loaded refrigerator to meet the requirements for the strength and the heat insulation at the same time.

The skin layers of foamed molding structure prepared according to the RIM process work as members controlling the strength as well as the hardness, and the strength and the hardness are increased with increasing density. On the other hand, the core layer works as a member controlling the heat insulation, and the heat insulation efficiency is generally improved with decreasing density.

On the basis of these physical phenomena, the present inventors have made extensive studies in view of the appropriate values of RIM structure satisfying the requirements for cases for automobile air conditioners or car-loaded refrigerators, for example, heat insulation $\lambda$(0.02–0.08 W/m-k), strength (5–30 MPa), hardness (Shore D 60–75), weight and economics (production cost) and have obtained the following results.

The overall density of a molding must be in the range of 100 to 700 kg/m$^3$. The overall density of 100 kg/m$^3$ can give heat insulation on the same level as that for refrigerator case, and the overall density of 700 kg/m$^3$ can give heat insulation on the same level as that for ABS molding with a heat-insulating foamed layer. Practical overall density for cases for automobile air conditioners is 300 to 700 kg/m$^3$, and that for cases for car-loaded refrigerators is 100 to 500 kg/m$^3$.

The heat-insulating case for automobile according to the present invention has an integrated structure comprised of parts with locally different densities, where the parts subject to vibrating and impact loads are made from rigid molding having a high density (about 800 to about 1,200 kg/m$^3$) and a low foaming ratio to share the strength, and other parts have a sandwich structure having a low density (about 50 to about 700 kg/m$^3$) and a high foaming ratio to share the heat insulation. Particularly, the parts as the members controlling the strength have a high density obtained by increasing local heat dissipation of a mold. The local heat dissipation of a mold can be attained, for example, by providing circulation holes for a coolant such as oil or water in a mold, or by using an insert core of high heat dissipation material in a mold, or further providing holes for a coolant or cooling cylinders in the insert core, and by rapidly circulating the coolant through the holes or inserting the cooled cylinders into the holes, thereby artificially increasing the heat dissipation of the insert core. By modifying the mold as described above, the desired molding can be obtained by one injection according to the RIM process.

In preparing a sandwich structure having skin layers and a core layer between the skin layers, special improvement has been made to the mold and the RIM process to obtain a high density at the parts as members controlling the strength, that is, the mounting support parts of cases for automobile air conditioner and the bottom part of inner case structure for cases for car-loaded refrigerators (the bottom part is subject to impact load of, for example, beer bottles, etc. placed therein owing to car vibration). In other words, an intensive cooling means is provided in the mold to increase heat dissipation. In the case of using an insertion core, a higher heat dissipation material is used in the insert core, as compared with the material in other parts in the mold than the insert core, and furthermore holes for circulating a coolant or for inserting cooled cylinders are provided in the insert core when foaming and hardening of the compositions have proceeded in a mold, and the coolant is circulated through the holes rapidly, or thoroughly cooled cylinders, as cooled by sealing a coolant such as dry ice into the cylinders in advance, are inserted into the holes to quench the mold, and it has been found that the density of skin layers can be increased in a short time.

According to the foregoing finding, the parts as members controlling the strength can be selectively formed as high density structures.

From a practical viewpoint of a heat insulating structure, the overall density of a molding is practically 300 to 700 kg/m$^3$ for cases for automobile air conditioners, and 100 to 500 kg/m$^3$ for cases for car-loaded refrigerators, as already described before. On the other hand, the requirement for a molding with a lighter weight can be met with a molding with a smaller overall density, which has better heat insulation but lower strength than a molding with a larger overall density. Thus, it is preferable to use a metallic insert for fitting with the mounting or for female screws or parts to be fixed with screws, etc. to give sufficient strength and improve a safety factor. A rigid skin layer is formed on the metal surface of the metallic insert according to the RIM process, and the molding can be strongly secured thereby. The metallic insert increases the weight of a molding only by a few percents, which is no substantial problem.

In the RIM process still now under development, it is enough for the heat-insulating structures for stationary apparatuses such as room air conditioners only to take both requirements for heat insulation and strength into account at the same time in view of the overall density. On the other hand, heat-insulating cases for automobile air conditioners or car-loaded refrigerators are subject to vibration during the driving or transporting, the requirements for structural strength are on a much higher level. To meet the requirements, the present invention provides a heat-insulating RIM molding of integrated structure having portions of high density as members controlling the strength and portions of low density as members controlling the heat insulation.

In this connection, it has been experimentally found that a heat-insulating molding prepared according to the RIM process has better heat insulation at an overall density of less than 100 kg/m$^3$ and also has a lighter weight and better economics, but has particularly lower strength, and thus is not on a practical level as a structure, and that at an overall density of more than 700 kg/m$^3$, on the other hand, no better heat insulation is obtained, so that the requirements for cases for automobile air conditioners or car-loaded refrigerators are not satisfied.

As to a ratio of the skin layer density ($\rho_s$) to the core layer density ($\rho_c$), it has been further found that at $\rho_s/\rho_c < 2$ ($\rho_c$ is usually in the range of 30–70 kg/m$^3$), the surface hardness is small, so that the molding is not on a practical level against an external impact load, whereas at $\rho_s/\rho_c > 30$, the core density is so low that the molding is liable to undergo bending, crushing or deformation due to an external load and thus it is not practically desirable.

Raw materials for use in the present invention will be described in detail below:

(1) Polyol is a mixture of the following three polyol compounds (a) to (c):

(a) Aliphatic amine-based polyols:

Aliphatic amine-based polyols are compounds having 3 to 4 OH groups in a molecule and an OH value of 450 to 800 KOH mg/g, obtained by addition reaction of an aliphatic amine with an appropriate amount of an alkylene oxide in the presence of a basic catalyst. Examples of an aliphatic amine include monoethanolamine, triethanolamine, ethylenediamine, triethylenetetramine, hexamethylenediamine, diethylenetriamine, etc., and also include ammonia. Examples of an alkylene oxide include ethylene oxide, propylene oxide, butylene oxide, epichlorohydrin, etc. The aliphatic amine-based polyols can be used alone or in mixture of at least two thereof, and have a good compatibility with a foaming agent such as freon, etc.

(b) Aromatic amine-based polyols:

Aromatic amine-based polyols are addition compounds of 4,4'-diaminodiphenylmethane

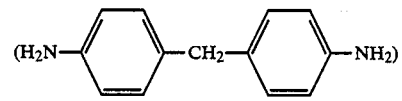

with an alkylene oxide, which have an OH value of 280 to 600 KOH mg/g, and have an action to improve the mechanical strength of a molding.

(c) Ordinary polyols:

The ordinary polyols are polyols having 2 or 3 OH groups in a molecule and an OH value of 30–100 KOH mg/g, obtained by adding an alkylene oxide to compounds having 2 or 3 active hydrogens in a molecule such as glycerine, trimethylolpropane, triethanolamine, monoethanolamine, ethyleneglycol, water, propyleneglycol, bisphenol A, bisphenol F, etc. and further include the polyols described in J. H. Saunders, K. G. Frish: "Polyurethanes, Chemistry and Technology, Part I, Chemistry and Part II Technology" Robert E. Krieger Publishing Company, Huntington, New York (1978); David Staly: "Analytical Chemistry of the Polyurethane, Polyurethanes: Part III" Robert E. Krieger Publishing Company, Huntington, New York (1979); Keiji Iwata: "Plastic Zairyo Koza (2) Polyurethane resin" Nikkan Kogyo Shinbun-sha (1975). The ordinary polyols are effective for giving elongation to a molding. Both polyols (b) and polyols (c) together give strength and impact resistance to a molding.

Mixing amounts of the polyols (a)–(c) are 20 to 60% by weight of polyols (a), 30 to 60% by weight of polyols (b), 15 to 40% by weight of polyols (c), total of polyols (a) to (c) being kept at 100% by weight. When each of the polyols (a) to (c) is outside the said corresponding range, the resulting molding fails to meet the requirements for cases for automobile air conditioners or car-loaded refrigerators. That is, at less than 20% by weight of polyols (a), the polyol mixture has a poor compatibility with a foaming agent such as freon, and liquid separation takes place. Thus, a problem appears at molding of cases. At more than 60% by weight of polyols (a), a molding as a case is too low in strength. At less than 30% by weight of polyols (b), a molding as a case is too low in strength. At more than 60% by weight of polyols (b), the mixture has a poor compatibility with a foaming agent such as freon, and a problem appears at molding of cases. At less than 15% by weight of polyols (c), a molding is too low in elongation, and becomes brittle resulting in short strength as a case. At more than 40% by weight of polyols (c), the elastic modulus is decreased and toughness is lost, resulting in short strength as a case.

(2) Polyisocyanates:

Polyisocyanates for use in the present invention include 4,4'-diphenylmethane diisocyanate (crude MDI) and carbodiimidized MDI, and can be used alone or in mixture thereof.

A mixing ratio of polyisocyanates (2) to polyols (1), i.e. a mixture of polyols (a)–(c), is 0.95–1.30/1 in terms of an isocyanate index, i.e. ratio of the number of NCO groups contained in the isocyanates to the number of OH groups contained in the polyols). 110–190 parts by weight of the polyisocyanates are preferable to 100 parts by weight of polyols from the viewpoint of heat resistance.

(3) Foam-controlling agent:

The foam-controlling agent for use in the present invention includes alkylene oxide-modified polydimethylsiloxane, and fluorine-based surfactants, and can be used alone or in mixture thereof. A mixing ratio is 1 to 5 parts by weight of the foam-controlling agent to 100 parts by weight of polyols (1).

(4) Foaming agent:

The foaming agent for use in the present invention includes water and organic liquid compounds of low boiling point such as trichloromonofluoromethane, dichlorodifluoromethane, methylene chloride, trichlorotrifluoroethane, and tetrachlorodifluoroethane, and is used alone or in mixture thereof. A mixing ratio is 5 to 45 parts by weight per 100 parts by weight of polyols (1).

(5) Catalyst:

The catalyst for use in the present invention includes diaza-bicyclo-alkene such as 1,4-diazabicyclo[2,2,2]octane (triethylenediamine), 1,8-diazabicyclo[5,4,0]-undecene-7 (DBU), 1,5-diazabicyclo[4,2,0]octrene-5, 1,8-diazabicyclo[7,2,0]undecene-8, 1,4-diazabicyclo[3,3,0]octene-4, 3-methyl-1,4-diazabicyclo[3,3,0]octene-4, 3,6,7,7-tetramethyl-1,4-diazabicyclo[3,3,0]octene-4, 7,8,8-trimethyl-1,5-diazabicyclo[4,3,0]nonene-5, 1,8-diazabicyclo[7,3,0]dodecene-8, 1,7-diazabicyclo[4,3,0]-nonene-6, 1,5-diazabicyclo-[4,4,0]decene-5, 1,8-diazabicyclo[7,4,0]tridecene-8, 1,8-diazabicyclo[5,3,0]-decene-7, 9-methyl-1,8-diazabicyclo[5,3,0]-decene-7, 1,6-diazabicyclo[5,5,0]tridecene-6, 1,7-diazabicyclo[6,5,0]tridecene-7, 1,8-diazabicyclo[7,5,0]tetradecene-8, 1,10-diazabicyclo[7,3,0]dodecene-9, 1,10-diazabicyclo[7,4,0]tridecene-9, 1,14-diazabicyclo[11,3,0]hexadecene-13, 1,14-diazabicyclo[11,4,0]heptadecene-13, triethylenediamine, dimethylethanolamine, morpholines, pyperidines. These amines are used in the form of salts obtained by adding thereto a weak acid such as formic acid, oxalic acid, propionic acid, phosphoric acid, 2-ethylhexoic acid or the like, a strong acid such as nitric acid, hydrochloric acid, or the like, or a compound having a phenolic hydroxyl group such as phenol, cresol, or the like. The acids which are used in combination with these amines having a hetero ring in the molecule include Lewis acids and Brönsted acids. By masking the lone pair of these amines with an acid (i.e., in the form of salt of tertiary amine), the catalytic activity can be enhanced with an increase of temperature and the curing properties of the material can be enhanced without lowering flowability of the material.

The catalyst is used alone or in mixture thereof, and a mixing ratio is 0.2 to 10 parts by weight of the catalyst to 100 parts by weight of polyols (1).

Other materials for use in the present invention includes a filler such as organic and inorganic fibers, powder and granules; a pigment, a dye, a flame retardent, an antioxidant, etc., and can be used as mixed in the polyols or in the polyisocyanates.

The isocyanate composition and the polyol compositions are injected into a mold by the commercially available RIM machine, as described before.

BRIEF DESCRIPTION OF THE DRAWINGS

FIG. 4 is a plan view, FIG. 5 is a cross-sectional vertical view along the line V—V of FIG. 4, and FIG. 6 is a vertical side view.

FIG. 9 is a cross-sectional view of a cartridge.

FIG. 10 is a view showing supporting of cartridges by a cartridge holer.

FIG. 11 is a schematic view showing the outline of a car-loaded refrigerator.

PREFERRED EMBODIMENTS OF THE INVENTION

The present invention will be described in detail below, referring to Examples.

In Table 1, typical examples of raw material compositions for use in the present invention are given, and in Table 2 particulars and conditions for the RIM process are given.

Molding is carried out in the following manner

Liquids A and B of any of compositions Nos. 1 to 3 shown in Table 1 are placed into separate tanks, respectively, in an RIM machine, while sealing the tanks with a nitrogen gas under about 2 atmospheres, and circulated through a mixing head while stirring the liquids. The liquids A and B are mixed together under impingement against each other under a high pressure such as 150–200 kg/cm² through an orifice at the molding and injected into a mold.

Figure 3:
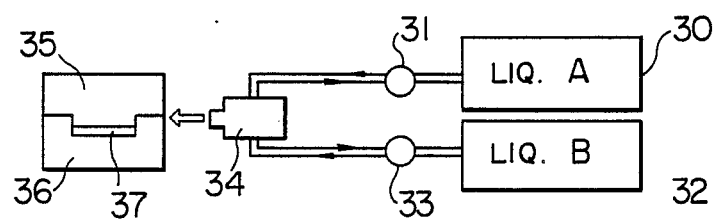
FIG. 3 is a schematic view showing the principle of RIM process.

That is, in the RIM process, as shown in FIG. 3, the liquid A circulating by pumping through a pump 31 from a tank 30 for liquid A and the liquid B circulating by pumping by a pump 33 from a tank 32 through a mixing head 34 is mixed under impingement against each other at molding, and injected into a cavity in a mold comprised of an upper mold part 35 and a lower mold part 36 to obtain a molding.

According to the present invention, a detachable insert core capable of being cooled by a coolant such as dry ice is provided at the cavity part to obtain a molding with the desired high density portions. That is, only the molding portions on the insert core in the cavity are made to have a particularly high density by the rapid cooling effect of the insert core.

Figure 1:
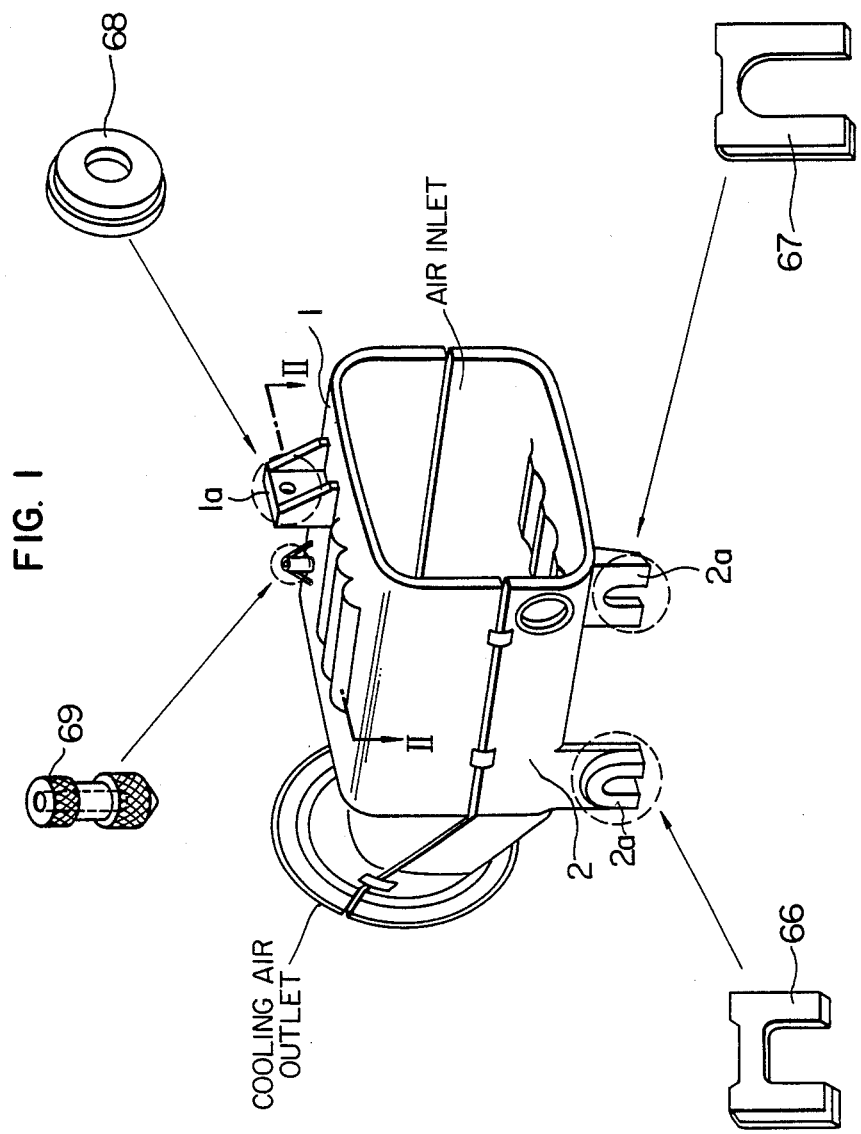
FIG. 1 is a schematic view showing a case for an automobile air conditioner.

The present invention will be described in detail below, referring to FIG. 1 showing an integrated structure with projected fixing parts 1a or 2a as high density portions of upper case part 1 and a lower case part 2 of a case for air conditioner as molded according to the RIM process as well as referring to the RIM process itself. When the case of air conditioner shown in FIG. 1 is applied as a unit case for automobile air conditioner, the upper case part 1 and the lower case part 2 of the case are fixed to a car body by projected fixing parts 1a and 2a, respectively, and thus the case must have a case body with a low density and high heat insulation and projected fixing parts with a high density and high strength. Particularly the root parts around the projected fixing parts must have a high density and high strength by the cooling effect.

Figure 7:
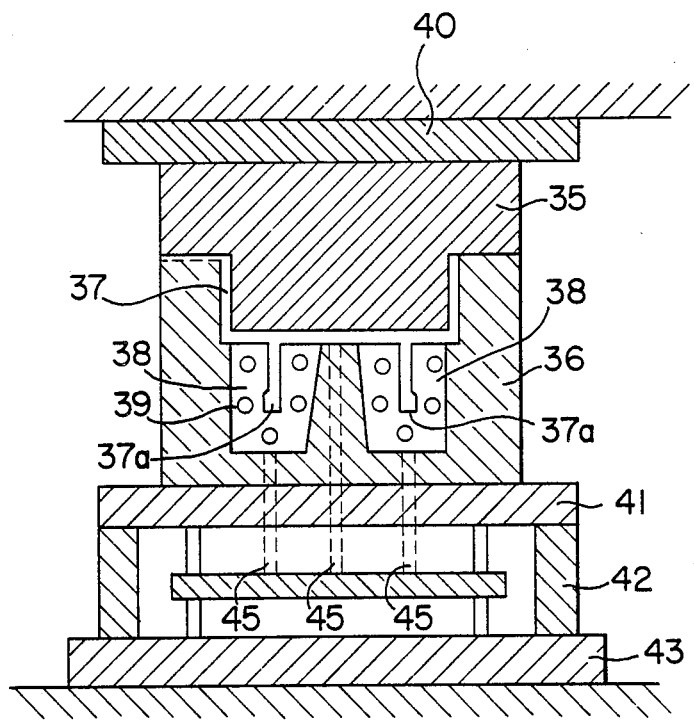
FIG. 7 is a schematic cross-sectional view showing a mold for use in the present invention.
Figure 8A:
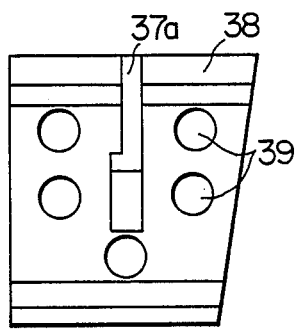
FIG. 8 (a) and (b) show the outline of an insert core.
Figure 8B:
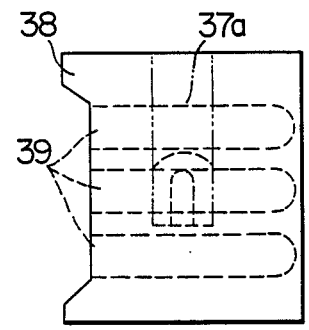

In FIG. 7, an RIM mold structure for use in the present invention is shown, where an entire mold cavity is comprised of a cavity 37 for molding the lower case part 2 and cavities 37a and 37a for molding the fixing parts 2a and 2a. That is, the cavity 37 for molding the case body is formed between an upper mold 35 fixed to an upper mold-fixing plate 40 and a lower mold 36 provided on a lower mold-fixing plate 43 through a lower mold-mounting plate 41 and spacer blocks 42. On the other hand, the cavities 37a for molding the fixing parts are provided in insert cores 38 with a cooling means. The insert cores 38 provided with holes 39 for encasing cartridges which are arranged around the cavities 37a, as shown in FIG. 8, are placed in the lower mold 36, as shown in FIG. 7. Numeral 45 shows pushing pins interlocked with an oil-hydraulic pushing rod 44, which are used to disengage a molding (i.e. unit case for automobile air conditioners) formed in the said cavities together with the inset cores 38 from the lower mold 36

As shown in FIGS. 8–10, the cooling means for the insert cores 38 are tubular metal cartridges 46 of thin wall thickness having one sealed end, and containing a coolant 48, the cartridges being detachably inserted into the holes 39 for encasing the cartridges. The cartridges must have a high thermal conductivity and a high rust resistance when their application conditions are taken into account, and it has been found that aluminum cartridges having the wall thickness of about 0.5 mm or stainless steel cartridges having the wall thickness of about 0.1 mm are preferable. The coolant 48 can be liquid nitrogen or liquid air, but preferably is flaky dry ice solidified from liquid carbon dioxide at about −75° C. owing to the handling convenience. In order to rapidly insert or take out several cartridges 46 into or from the holes 39 for encasing the cartridges in the insert cores 38 at the same time, it is preferable to detachably hold the cartridges 46 by a cartridge holder 49 as shown in FIG. 10. The cartridge holder 49 may be in a shape of steel frame. In order to seal the coolant 48 into cartridges 46, the cartridges are stoppered with caps 47 of aluminum or the like.

With the foregoing structure, the molding is carried out as follows.

In FIG. 7, the upper mold 35 and the lower mold 36 are heated and kept at the predetermined temperature, and then made apart from each other to place the insert cores 38 into the lower mold 36. The cavity 37 and the cavities 37a for molding the fixing parts in the insert cores 38 together form a mold cavity. Cartridges 46 containing the coolant 48 in advance have been inserted into the holes 39 for encasing the cartridges in the insert cores 38. Then, the liquid A and liquid B for RIM are mixed and injected into the mold cavity and subjected to foaming and hardening. After the predetermined hardening time, the upper mold and the lower mold are made apart from each other, and the molding thus formed and the insert cores 38 are pushed out together by the pushing pins. Then, the molding is taken out of the insert cores 38 to obtain the desired heat-insulating structure. Then, the cartridges are taken out of the insert cores 38, and fresh cartridges containing the coolant 48, as separately prepared, are newly inserted into the holes in the insert cores, and then the insert cores 38 are inserted into the cavities 37a for molding the fixing parts. Preferably, a mold-releasing agent is then applied to the mold, and the upper mold and the lower mold are clamped together and subjected to next run.

Molds for use in the following Examples are two model molds shown in Table 2, and actual model molds for molding cases for automobile air conditioners and car-loaded refrigerators. These molds have embedded coils for circulating a heating medium to control the mold temperature to a specific value.

For the cases for automobile air conditioners, insert cores having holes for encasing cartridges are used for molding fixing parts.

TABLE 1

| | Component | Compound | 1 | 2 | 3 |
|---|---|---|---|---|---|
| Liquid A | Aliphatic amino-based polyol (a) | PO* adduct of monoethanol-amine (OH value: 650 KOH mg/g) | 40 | 40 | 35 |
| | Aromatic amine-based polyol (b) | PO* adduct of 4,4'-diamino-diphenyl methane (OH value: 430 KOH mg/g) | 40 | 40 | 40 |
| | Ordinary polyol (c) | PO*, EO**-adduct of glycerine (OH value: 60 KOH mg/g) molar ratio of PO:EO = 2:1 | 20 | 20 | 25 |
| | Foam-controlling agent | Alkylene oxide-modified polydimethylsiloxane | 1.0 | 1.0 | 2.0 |

TABLE 1-continued

| Component | Compound | 1 | 2 | 3 |
|---|---|---|---|---|
| Foaming agent | $H_2O$ | — | — | 0.5 |
| | Trichloromonofluoromethane | 25 | 25 | 10 |
| Catalyst | DBU*** phenolate | 3.0 | 1.5 | 0.4 |
| | Triethylenediamine | — | 0.5 | 1.3 |
| Liquid B Polyisocyanate | Crude MDI**** (NCO content: 30.5 wt/%) | 118 | — | 149 |
| | Carbodiimidized MDI (Carbodimidization ratio: 30 wt % NCO content: 30 wt %) | — | 122 | — |

*Propylene oxide
**Ethylene oxide
***1,8-diazabicyclo(5,4,0)undecene-7
****4,4'-diphenylmethane diisocyanate

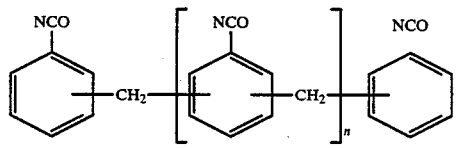

n: 0.3–0.8, 0.6 (average)

TABLE 2

| Item | |
|---|---|
| Apparatus Mold | Steel or resin mold, cavity dimensions: 500 × 800 × 10 mm |
| RIM machine | SH type, made by Battenfeld, West Germany |
| Molding conditions Mold temperature | 40°–80° C. |
| Liq. temp. Liq. A | 25°–30° C. |
| Liq. B | 20°–25° C. |
| Impinging and mixing pressure | 150–200 kg/cm² |
| Injection rate | 300–460 g/sec |

EXAMPLE 1

Characteristics of model moldings prepared from the raw materials No. 1 and No. 2 shown in Table 1 in the flat plate model mold given in Table 2 according to the RIM process as described above are shown in Table 3.

In this Example, the overall density of moldings is changed from 100 to 800 kg/m³ by controlling the injection amount. The strength and heat insulation (thermal conductivity) are changed with combination of skin layer density $\rho_s$ and core density $\rho_c$ even though the overall density of the molding is made constant. For $\rho_s/\rho_c$ can be controlled by changing mold material and mold temperature and consequently by changing a packing ratio in foaming and hardening depending upon the mold material and mold temperature because of utilization of differences in heat dissipation.

For 8 model moldings, the properties of moldings and bending strength (ASTM D790) and thermal conductivity as physical properties are shown in Table 3.

TABLE 3

| Item | Test Piece No. | | | | | | | |
|---|---|---|---|---|---|---|---|---|
| | 1 | 2 | 3 | 4 | 5 | 6 | 7 | 8 |
| Raw Material Na (Table 1) | 1 | 1 | 1 | 1 | 2 | 2 | 2 | 2 |
| Mold material | steel | steel | resin | resin | steel | steel | resin | resin |
| Overall density of molding (kg/m³) | 300 | 600 | 300 | 600 | 150 | 750 | 150 | 750 |
| Skin density of molding (kg/m³) | 1,200 | 1,150 | 900 | 800 | 900 | 900 | 700 | 1,000 |
| Core density of molding (kg/m³) | 45 | 50 | 60 | 90 | 30 | 60 | 90 | 80 |
| $\rho_s/\rho_c$ | 27 | 23 | 15 | 9 | 30 | 15 | 8 | 13 |
| Bending strength of molding (kg/cm²) | 350 | 650 | 290 | 520 | 160 | 890 | 130 | 730 |
| Thermal conductivity of molding (10³ W/m.k) | 34 | 72 | 35 | 77 | 20 | 90 | 25 | 93 |
| Vibration resistance (vibration: 33 Hz, 2.2 G, 3 hr) | OK | OK | OK | OK | OK | OK | OK | OK |

EXAMPLES 2–4 AND COMPARATIVE EXAMPLES 1–2

RIM moldings are prepared from raw material No. 1 of Table 1 in a mold for cases for automobile air conditioners, as made from injection molding resin (a mixture of polyurethane and metal powder) made by Nippon Jushigata Seisakusho Limited, Japan, according to the insert core cooling process. Appearance of the case molding is shown in FIG. 1, where the case is comprised of a upper case 1 and a lower case 2.

Figure 2:
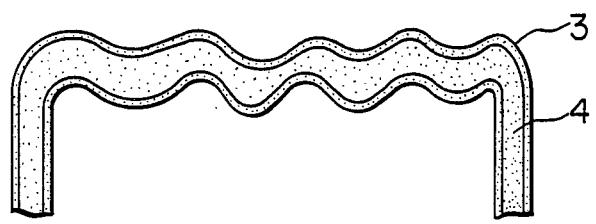
FIG. 2 is a cross-sectional view along the line II—II of FIG. 1.

In FIG. 2, a cross-sectional view along the line II—II of FIG. 1 is shown, where numeral 3 shows a rigid skin layer, and numeral 4 shows a structure with independent foam cells.

Many moldings with different densities are prepared, among which those with typical densities are selected and subjected to tests, and the results are shown as Examples 2–4 and Comparative Examples 1–2 in Table 4.

When the overall density is as low as 100 kg/m³, good heat insulation can be obtained, but there are problems in vibration and drop strength. When the overall density is as high as 900 kg/cm³, the strength is satisfactory, but no good heat insulation is obtained, and a dewing test is not satisfactory. Desirable overall density for the practical level is 300–700 kg/m³.

TABLE 4

| Example No. | 2 | 3 | 4 | Comp. 1 | Comp. 2 | 5 | 6 |
|---|---|---|---|---|---|---|---|
| Raw material No. (Table 1) | 1 | 1 | 1 | 1 | 1 | 3 | 3 |
| Average density (kg/m$^3$) | 300 | 600 | 800 | 100 | 900 | 350 | 500 |
| Density at heat insulating part (kg/m$^3$) | 230 | 520 | 680 | 100 | 900 | 270 | 410 |
| Density at fixing part (kg/m$^3$) | 800 | 950 | 1,050 | 100 | 900 | 800 | 930 |
| Density test* | OK | OK | OK | OK | NO | OK | OK |
| Vibration test** | OK | OK | OK | NO | OK | OK | OK |
| Drop strength*** | OK | OK | OK | NO | OK | OK | OK |

*Dewing state is investigated by supplying cold air at 5° C. into the test case in the surrounding atmosphere at 35° C. and 70% RH.

**An evaporator is encased in the test case and the test case is subjected to vibration in an actual mounting state at vibration frequency of 66 Hz and vibration acceleration of 2.2 G for 3 hours (JIS D 1601)

***The test case is dropped onto a concrete floor in the most breakable direction of the test case to investigate the drop height when broken. The test case is OK if broken at a drop height of 50 cm or higher.

EXAMPLES 5 AND 6

Figure 4:
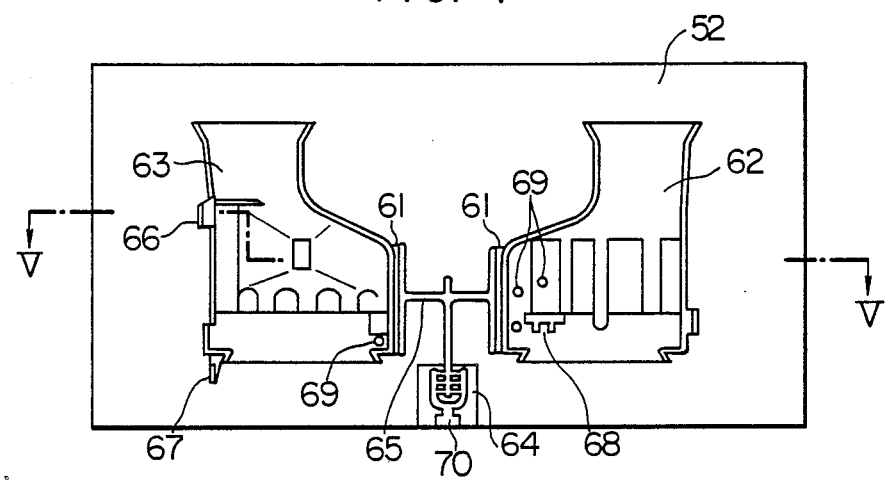
FIGS. 4–6 are views showing a steel mold for molding a case for automobile air conditioner according to the RIM process, where
Figure 5:
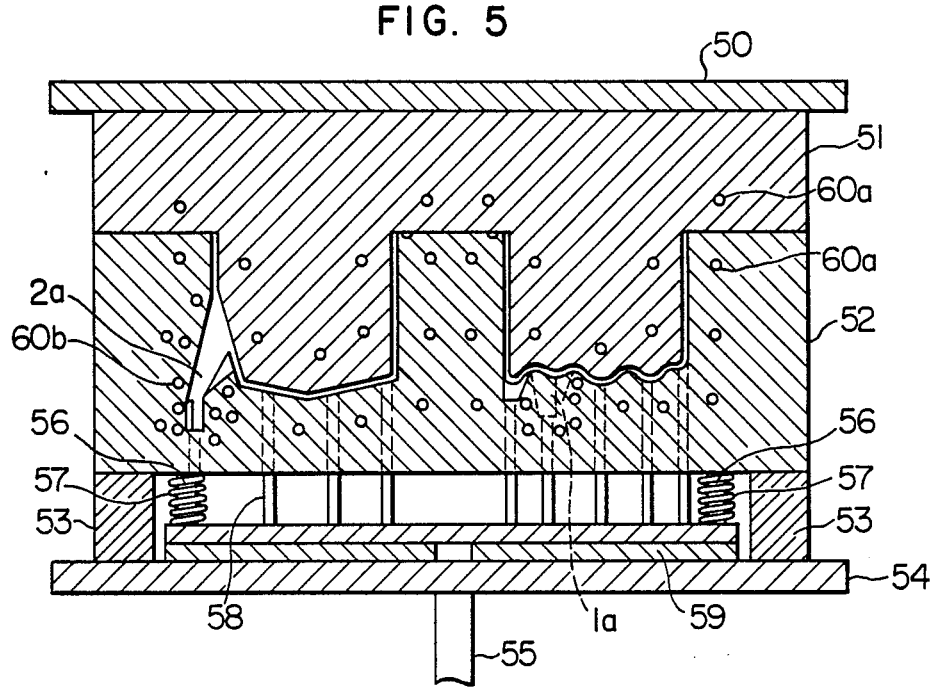
Figure 6:
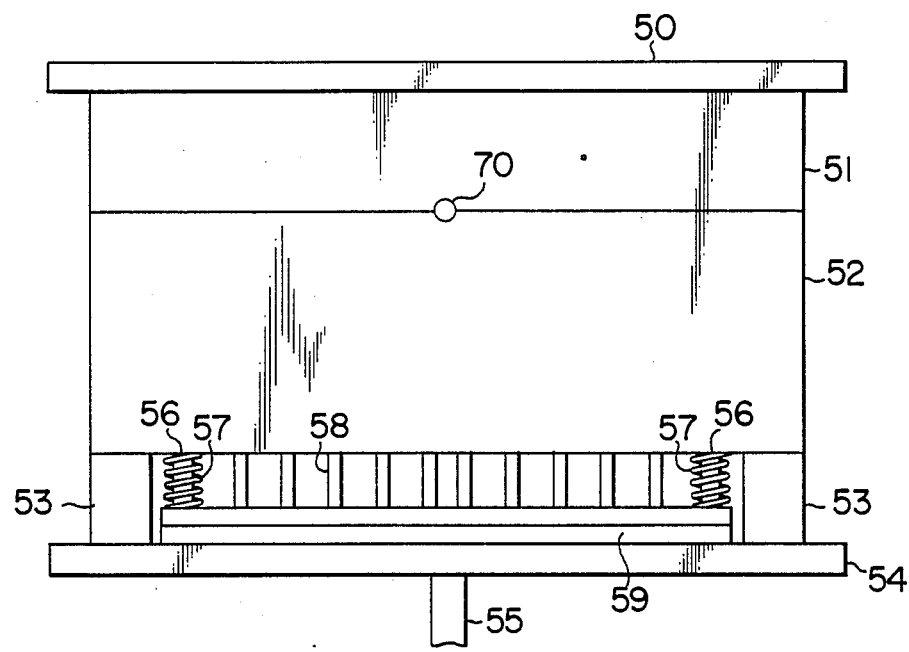

Cases for automobile air conditioners are prepared from the raw material No. 3 in Table 1 in steel molds shown in FIGS. 4–6 according to the RIM process.

In FIGS. 4–6, numeral 50 is an upper mold-fixing plate, 51 a steel upper mold, 52 a steel lower mold, 53 spacers, 54 a lower mold-fixing plate for fixing the lower mold 52 through the spacers 53, 55 an injector pin of a mold clamping mechanism, 56 guide pins, 57 springs, 58 injector pins, 59 an injector plate, 60a heating medium passages at 40° C.–60° C., 60b coolant passages at 0° –5° C., 62 a cavity for upper case part of the case for automobile air conditioner in the lower mold 52, 63 a cavity for lower case part of the case for automobile air conditioner in the lower mold 52, 64 an after-mixer, 65 a runner, 61 gates, 66 a U-type metal insert inserted in the cavity 53, 67 a U-type metal insert inserted in the cavity 63, 68 is a metal washer insert inserted in the cavity 62, 69 is a female screw metal insert inserted in the cavity 62, and 70 an injection inlet for injecting a mixture of liquid A and liquid B into the after-mixer 64.

With the foregoing structure, the insert members 66, 67, 68 and 69 are inserted while the upper mold 51 is taken apart together with the upper mold-fixing plate 50, and then the upper mold 50 is clamped together with the lower mold 52. Then, the entire mold is kept to a temperature of 40° to 80° C. with a heating medium passing through the passages 60a for heating medium, while the cavities 1a and 2a for the fixing parts are kept to a temperature of 0°-5° C. by a coolant passing through the passages 60b for coolant, provided around the cavity. A mixture of liquid A and liquid B of raw material No. 3 in Table 1 at a temperature of 25°–35° C., obtained by impingement, is injected into the injection inlet to the mold kept in that state, mixed by the after-mixer 64 and injected into the cavities 62 and 63 through the runner 65 and gates 61 while controlling the injection rate so that the overall densities can be 350 kg/m$^3$ and 500 kg/m$^3$ for Examples 5 and 6, respectively, as shown in Table 4, whereby the upper case part 1 and the lower case part 2 of the case for automobile air conditioner can be molded at the same time.

At that time, in the upper case part 1 and the lower case part 2, the body parts (heat insulated part) are at a mold temperature of 40°-60° C., and can have a thin skin layer and low densities of 270 kg/m$^3$ and 410 kg/m$^3$ for Examples 5 and 6, respectively, whereas the fixing parts are at a mold temperature of 5°-25° C., and can have high densities of 800 kg/m$^3$ and 930 kg/m$^3$ for Examples 5 and 6, respectively. Thus, practically applicable cases for automobile air conditioners can be produced, as shown in Table 4.

EXAMPLES 7-9 AND COMPARATIVE EXAMPLES 3-4

In FIG. 11, a schematic appearance of a carloaded refrigerator is shown, wherein numeral 5 shows a refrigerator box for encasing a material to be cooled, and the present invention is directed to the box. Numeral 6 is a cooling unit comprising a refrigeration cycle, a cooled gas passage, and a power source, and numeral 7 is a punch key for connecting the box to the cooling unit.

Figure 12:
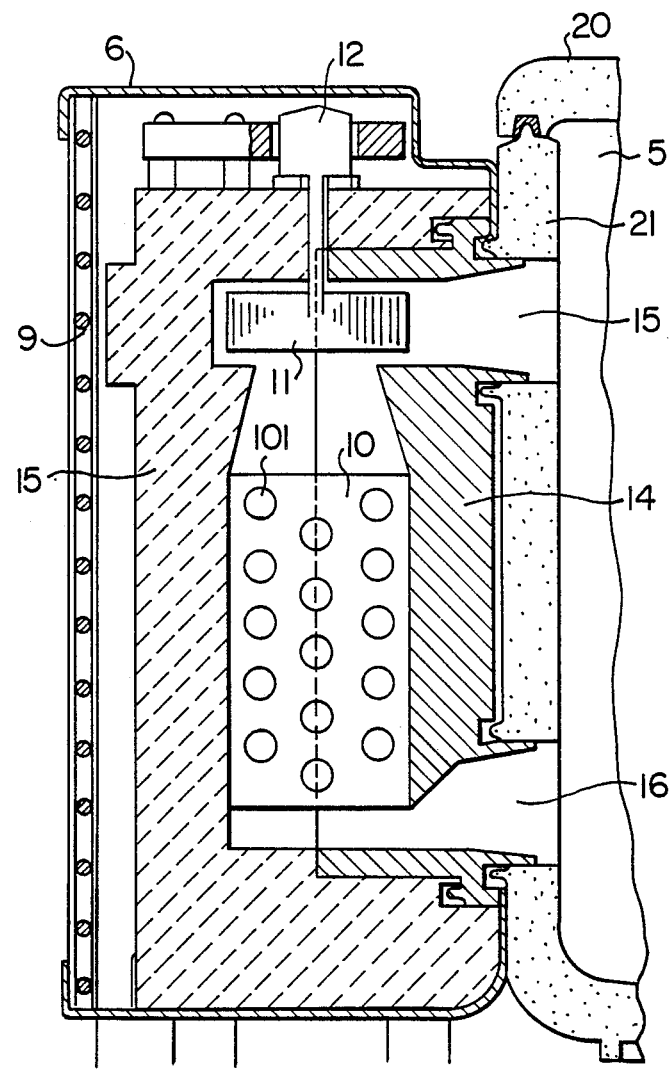
FIG. 12 is an overall view showing a passage for circulating a coolant in a car-loaded refrigerator.

In FIG. 12 an overall structure of a passage for a cooled gas circulation passage in a car-loaded refrigerator is shown.

Figure 13:
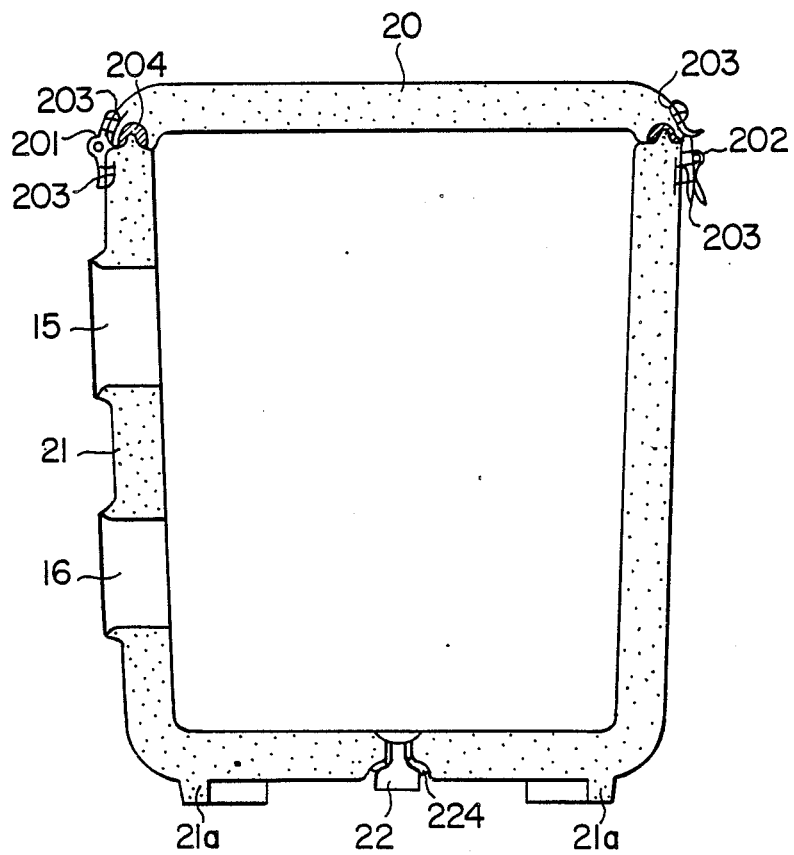
FIG. 13 is a view showing an overall structure of a case for refrigerator molded according to the present invention.

In FIG. 13, an overall structure of a refrigerator box is shown.

Many refrigeration boxes are molded from low material No. 2 in Table 1 in a steel mold according to the RIM process, while changing the density of moldings, and typical moldings are selected therefrom and subjected to tests.

Results are shown in Table 5 as Examples 7-9 and Comparative Examples 3 and 4. Molding having the overall density of 80 kg/m$^3$ has good heat insulation and can meet the in-box temperature drop test, but is low in strength, and partly damaged in vibration test. Molding having the overall density of 700 kg/m$^3$ has satisfactory strength and can meet the vibration test, but is poor in heat insulation and thus cannot meet the in-box temperature drop test. Thus, the desirable practical level for the overall density is about 100 to about 500 kg/m$^3$.

In FIG. 11, numeral 8 is a compressor, 9 a condenser, 10 an evaporator, 11 a fan, 12 a motor, 13 a heat insulating member A, 15 a cooled gas inlet, 16 a cooled gas outlet, 18 a power source cord, and 23 a plug.

In FIG. 12, numeral 20 is a refrigerator box cover, 21 a refrigerator box body, 14 a heat-insulating member B, and 101 a pipe.

In FIG. 13, numeral 5 is a refrigerator box molded according to the RIM process, 15 a cooled gas inlet, 16 a cooled gas outlet, 21 a refrigerator box body, 20 a cover molded according to the RIM process separately from the body, 22 a drain plug, 201 a hinge, 202 a punch key, 203 a back plate, 204 a cover packing, and 224 a drain packing.

In FIG. 13, an impact resistance can be obtained by making the support parts 21a projected at the bottom of the body 20 have a high density.

Practically applicable refrigerator boxes can be molded from the raw material according to the RIM process.

TABLE 5

| Example No. | 7 | 8 | 9 | Comp. Ex. 3 | Comp. Ex. 4 |
|---|---|---|---|---|---|
| Overall density (kg/m³) | 100 | 200 | 450 | 80 | 700 |
| Wall density (kg/m³) | 80 | 160 | 320 | 80 | 700 |
| Bottom density (kg/m³) | 300 | 540 | 730 | 80 | 700 |
| In-box temperature drop test* | OK | OK | OK | OK | NO |
| Vibration test** | OK | OK | OK | NO | OK |

*Time required for lowering the in-box temperature to 0° C. by operating a refrigerator at the ambient temperature of 40° C. is measured. Not more than 60 minutes is OK.
**Aluminum beer cans having a net content of 500 ml are filled in the refrigerator box to a full content, and subjected to vibrations at a vibrating frequency of 66 Hz and vibration acceleration of 2.2 G for 3 hours, and then the state of damage is investigated.

As described above, the present invention provides heat-insulating cases having an integrated structure of skin layers of high density at the surface and a core layer of independent foam cells therebetween, molded by one shot from the novel raw materials according to the RIM process, and thus the cases with the high insulation and high impact resistance as desired can be obtained with a high productivity, and are practically applicable to automobile air conditioners, car-loaded refrigerators, etc.

What is claimed is:

1. A heat-insulating structure for an automobile air conditioner, which heat-insulating structure comprises a body part with projected parts on its outer surface, the body part being a body part consisting of an upper case part and a lower case part of foamed polyurethane resin, the upper and lower case parts being case parts formed by mixing and foaming a liquid A and a liquid B, the liquid A comprising 100 parts of a mixture of polyols consisting of 20 to 60% by weight of an aliphatic amino-based polyol, 30-60% by weight of an alkylene oxide adduct of 4,4'-diaminodiphenylmethane and 10 to 40% by weight of a polyol obtained by adding an alkylene oxide to compounds having two or three active hydrogens, total thereof being kept to 100% by weight, 1 to 5 parts by weight of a foam-controlling agent, 5 to 45 parts by weight of water or an organic liquid compound of low boiling point as a foaming agent and 0.2 to 10 parts by weight of a catalyst, and the liquid B comprising 110 to 190 parts by weight of polyisocyanate on the basis of 100 parts by weight of the mixture of the polyols, the heat-insulating structure having an overall density of 300–700 kg/m³; the body part having a density of 50 to 700 kg/m³, and having skin layers of a high density sandwiching a core of lower density containing independent foam cells, the core being a core integrally molded with the skin layers; and the projected parts being of higher density than that of the body part, the projected parts having a density of 800–1200 kg/m³, the projected parts having U-type metal inserts, metal washer inserts or screw metal inserts therein, the projected parts being integrally molded together with the body part.

2. The heat insulating structure according to claim 1, wherein 110 to 190 parts by weight of 4-4'-diphenylmethanediisocyanate having the following formula is contained in the liquid B per 100 parts by weight of the total of the polyols:

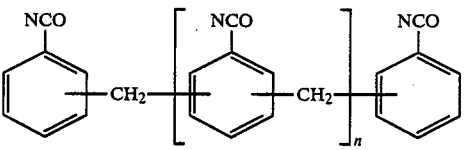

wherein n is 0.3–0.8.

3. The heat-insulating structure according to claim 1, wherein said alkylene oxide used in forming the alkylene oxide adduct of 4,4'-diaminodipheyl-methane is propylene oxide.

4. The heat-insulating structure according to claim 3, wherein said polyol obtained by adding an alkylene oxide to compounds having 2 to 3 active hydrogens is a polyol obtained by adding an alkylene oxide to glycerine.

5. The heat-insulating structure according to claim 4, wherein said catalyst contains at least 1,8-diazobicyclo-(5,4,0)-undecene-7.

6. The heat-insulating structure according to claim 1, wherein said liquid A includes 0.4–3.0 parts by weight of 1,8-diazobicyclo-(5,4,0)-undecene-7 as the catalyst.

7. The heat-insulating structure according to claim 1, wherein said structure includes an opening to act as an air inlet and an opening to act as a cooling air outlet.

8. The heat-insulating structure according to claim 1, wherein the body part of foamed polyurethane resin is a body part formed by reaction injection molding of said liquid A and said liquid B.

9. The heat-insulating structure according to claim 1, wherein the ratio of the skin layer density to the core density is 2–30.

10. The heat-insulating structure according to claim 1, wherein the alkylene oxide adduct of 4,4'-diaminodiphenylmethane has an OH value of 280–600 KOH mg/g.

11. The heat-insulating structure according to claim 1, wherein the polyisocyanate is at least one selected from the group consisting of 4,4'-diphenylmethane diisocyanate and carbodiimidized MDI.

12. The heat-insulating structure according to claim 1, wherein the core and skin layers are made of the same polyurethane resin, the core being integral with the skin layers.

13. A heat-insulating structure for an automobile refrigerator, which heat-insulating structure comprises a body part with projected parts on its outer surface, the body part being a body part made of foamed polyurethane resin, the body part being a body part formed by mixing and foaming a liquid A and a liquid B, the liquid A comprising 100 parts of a mixture of polyols consisting of 20 to 60% by weight of an aliphatic amino-based polyol, 30–60% by weight of an alkylene oxide adduct of 4,4'-diaminodiphenylmethane and 15 to 40% by weight of a polyol obtained by adding an alkylene oxide to compounds having 2 to 3 active hydrogens, total thereof being kept to 100% by weight, 1 to 5 parts by weight of a foam-controlling agent, 5 to 45 parts by weight of organic liquid compounds of low boiling point as a foaming agent and 0.12 to 10 parts by weight of a catalyst, and the liquid B comprising 110 to 190 parts by weight of polyisocyanate on the basis of 100 parts by weight of the mixture of the polyols, the heat-insulating structure having an overall density of 100–500 kg/m³; the body part having a density of 50–700 kg/m$^3$, and having skin layers of a high density sandwiching a core of lower density containing independent foam cells, the core being a core integrally molded with the skin layers; and the projected parts being of higher density than that of the body part, the projected parts having a density of 800–1200 kg/m$^3$, the projected parts being integrally molded together with the body part.

14. The heat-insulating structure according to claim 13, wherein the body part of foamed polyurethane resin is a body part formed by reaction injection molding of said liquid A and said liquid B.

15. The heat-insulating structure according to claim 13, wherein the ratio of the skin layer density to the core density is 2–30.

16. The heat-insulating structure according to claim 13, wherein the core and skin layers are made of the same polyurethane resin, the core being integral with the skin layers.

* * * * *